United States Patent Office 3,565,668

Patented Feb. 23, 1971

3,565,668

PROCESS FOR PREPARING MICROPOROUS SHEET MATERIALS

Francis J. Farrell, Nashville, Tenn., assignor to E. I. du Pont de Nemours and Company, Wilmington, Del., a corporation of Delaware No Drawing. Continuation-in-part of application Ser. No. 705,609, Feb. 15, 1968. This application May 27, 1968, Ser. No. 732,047

Int. Cl. B44d *1/44*

U.S. Cl. 117—63 8 Claims

ABSTRACT OF THE DISCLOSURE

A process for preparing microporous sheet materials is disclosed wherein a layer of a polymer solution containing the required amount of inert liquid is applied at a suitable temperature to a substrate (e.g., a fabric), and then the layer of solution is subjected to cooling and bathing conditions such that (1) the layer is cooled by at least 5° C., (2) the solution is converted to a substantially colloidal polymeric dispersion and (3) the layer is bathed with a suitable bathing liquid adapted to extract said solvent until substantially all the solvent is extracted.

CROSS-REFERENCE TO RELATED APPLICATION

This is a continuation-in-part of my present application Ser. No. 705,609, filed on Feb. 15, 1968, and now abandoned.

This invention relates to a process for preparing microporous sheet materials in the form of films or microporous coatings applied in adherence with fabrics or other suitable substrates.

SUMMARY OF THE INVENTION

The present invention in a broad sense provides a process for preparing microporous polymeric films and coatings which comprises (A) Providing a solution of a polymeric material in a mixture of a suitable solvent and an inert liquid, said solution having a temperature of at least 20° C., said inert liquid being a non-solvent for said polymeric material and miscible with said solvent, an said solution containing said inert liquid in an amount equal to that which enables the solution to become a substantially colloidal polymeric dispersion when cooled by at least 5° C., (B) Applying a layer of the resulting solution to a suitable substrate, (C) Subjecting said layer to cooling and bathing conditions such that (1) the layer is cooled by at least 5° C., (2) the solution is converted to a substantially colloidal polymeric dispersion and (3) the layer is bathed with a bathing liquid adapted to extract said solvent until substantially all the solvent is extracted, and (D) Drying the resulting cooled, bathed layer.

During the bathing step of C–3, the layer becomes fully coagulated.

The layer of solution employed in step (B) can, if desired, be prepared by heating a colloidal polymeric dispersion sufficiently to convert it to a solution.

DESCRIPTION OF PREFERRED EMBODIMENTS

When using the process in the manufacture of leather-like sheet materials, the substrate is preferably a nonwoven fabric or a woven fabric, or a composite fabric having a woven fabric in superposed relation with a nonwoven fabric. One very useful nonwoven fabric is one containing a solidified polymeric impregnant having a porous moisture-permeable structure; such a fabric can be prepared, for example, by the procedure described in Example 1 of U.S. Pat. 3,067,483, issued Dec. 11, 1962, to J. L. Hollowell. Among the other useful substrates are porous fibrous sheets prepared by papermaking techniques, and natural and manmade suede materials.

The polymeric material of the solution in step (A) of the process preferably has a secant tensile modulus at 5% elongation of over 600 p.s.i., still more preferably about 800–3000 p.s.i. The secant tensile modulus is the ratio of the stress to the strain at 5% elongation of the polymer sample determined from the tensile stress-strain curve, and is expressed as force per unit area, e.g., pounds per square inch (often expressed as p.s.i.). The secant tensile modulus measurement is carried out according to ASTM D–882–64–T, modified as described below.

The secant tensile modulus of the polymer is determined by forming a 5- to 20-mil thick continuous void-free polymer film from a polymeric solution, for example, the solution to be used in step (A) of the present process. The film is formed by casting the polymeric solution on a glass plate and the solution is then dried, e.g., at 105° C. for 90 minutes.

The stress-strain curve, which is necesary to calculate the secant tensile modulus of the polymer, is preferably obtained on an instron Tensile Tester, using a ½ inch wide specimen cut from the void-free polymeric film, with about one inch between grips. The following settings are preferably used on the Instron Tester to obtain a stress-strain curve: chart speed of 10 inches per minute, cross-head speed of 1 inch per minute, and a full scale load of 2 to 5 pounds.

The secant tensile modulus is obtained from the chart of the force vs. strain curve by drawing a line at 5% specimen elongation (strain) parallel to the force axis of the chart. The point at which this line intersects the force/strain curve defines the force in pounds necessary to elongate the specimen 5%. This force value is divided by the initial cross-sectional area of the specimen to give the corresponding stress value in pounds per square inch. This stress value is divided by the strain (0.05) to give the secant tensile modulus.

A preferred polymeric material is one having a polyurethane elastomer content of at least 51% by weight and a vinyl chloride polymer (e.g., polyvinyl chloride) content of up to 49% by weight. Pigments and other additives can be added if desired.

Among the polymers useful in practicing the present invention are those described in U.S. Pat. 3,100,721, issued Aug. 13, 1963, to E. K. Holden (e.g., see column 3, line 19 to column 6, line 63). The disclosure of this patent is incorporated herein by reference.

The solution provided in step (A) preferably has a temperature of about 37–90° C. and an inert liquid content of about 3–10% (based on the total weight of the solution); and still more preferably a temperature of about 37–50° C. and an inert liquid content of about 3–5%.

When using the preferred polymers, the solvent of the solution provided in step (A) is preferably dimethylformamide and the inert liquid is preferably water. Other useful solvents and inert liquids are disclosed in U.S. Pat. 3,100,721.

As indicated in U.S. Pat. 3,100,721 (e.g., in column 8, lines 50–54), when forming a colloidal polymeric dispersion by adding an inert liquid to a polymer solution, the amount of inert liquid required to convert the solution to a dispersion at one temperature may not be enough to convert it to a dispersion at a higher temperature. It is to be understood that step (A) of the process of the present invention can be performed by (1)

adding enough inert liquid to the solution to form a substantially collidal polymeric dispersion (e.g., about 3–10% inert liquid base on the total weight of the mixture, and then (2) raising the temperature of the resulting dispersion until it is converted back to a polymer solution.

If desired, the layer of solution applied in step (B) can be exposed to a humid-air zone to cause it to absorb a small amount of water.

At least the last portion of the bathing operation mentioned in step (C) preferably employs a bathing liquid which can easily be removed from the sheet material by evaporation in a heat zone (e.g., water).

One skilled in the art will have no difficulty in selecting a useful liquid for the bathing operation—a liquid capable of extracting the solvent without causing collapse of the microporous structure or other objectionable changes in the product.

The present process has beneficial utility for the manufacture of composite leatherlike sheet materials useful as breathable shoe uppers, upholstery material and the like. The process does not require the extremely accurate control of the amount of inert liquid added to the polymer solution as does the process of U.S. Pat. 3,100,721. And the process does not require such accurate control of the composition of the bathing liquid as does the proces of U.S. Pat. 3,208,875, the disclosure of which is incorporated herein by reference.

A thickening agent can be added to the coating composition, as already indicated in U.S. Pat. 3,208,875 (e.g., in column 6, lines 15–18), to increase the viscosity of the composition; if desired, the thickening agent can be one which renders the composition thixotropic.

The examples which follow are given for the purpose of illustrating the invention. All quantities shown are on a weight basis unless otherwise indicated.

EXAMPLE 1

A mosture-permeable leatherlike sheet material useful as a shoe-upper material is prepared by (1) Providing a nonwoven fabric which (a) has been made from polyester fibers, (b) contains as a solidified polymeric impregnant a polyurethane elastomer having a porous moisture-permeable structure, (c) has been prepared in accordance with the teaching of Example 1 of U.S. Pat. 3,067,483, but greater in thickness, (d) has a thickness of 60 mils, a density of 0.38 gram per cubic centimeter, a width of 14 inches and a length of 100 yards, and (e) has been wound up on a storage roll;

(2) Providing a liquid polymeric solution in which the polymer component has a secant tensile modulus at 5% elongation of about 1200 p.s.i., and which has been prepared by (a) making a blended polymer solution consisting of 12.9% polyurethane elastomer, 4.3% polyvinyl chloride and 82.8% dimethylformamide according to the following procedure: A 20% solution of polyurethane elastomer is prepared according to the procedure described in U.S. Pat. 3,284,274, column 11, lines 57–75, which patent issued Nov. 8, 1966, to D. G. Hulslander et al.; then the blended polymer solution is prepared by admixing a 12% solution in dimethylformamide of polyvinyl chloride with a suitable amount of the polyurethane solution; (b) heating the solution to 45° C. and adding a 1:4 blend of water and dimethylformamide to the solution while stirring and keeping the temperature at 45° C. until the mixture has a water content of 5.0%;

(3) Coating the fabric provided in step 1 with the liquid polymeric solution at 45° C. provided in step 2 by means of a doctor-knife coating apparatus in an amount sufficient (about 65 mils) to obtain a film thickness of 20 mils at the end of step 5;

(4) Passing the resulting composite sheet material coating-side-up through a cooling chamber until the layer of solution has been cooled to 25° C. and thereby converted to a substantially colloidal polymeric dispersion;

(5) Bathing the liquid polymeric composition of the resulting composite sheet by (a) immersing the sheet in a tank containing water at 18° C. for 9 minutes, (b) immersing the sheet in a tank containing water at 65° C. for 9 minutes, and (c) passing the sheet over a rotary vacuum drum provided with a supply of clean rinse water at a tempearture of 80° C., thereby completing the coagulation of the polymer and the leaching therefrom of organic solvent; and (6) Drying the resulting sheet material in a heat zone at 120° C.

The resulting sheet material can of course be subjected to known methods of finishing leatherlike sheet materials, for example dyeing, coating with various pigmented or clear coating compositions and embossing with desired grains or patterns.

EXAMPLE 2

An equally useful leatherlike shoe-upper material is prepared by repeating Example 1 except step (2*b*) is replaced with the following: A 1:4 blend of water and dimethylformamide is added to the solution provided in step (1*a*) while stirring and keeping the mixture at about 24° C. until the mixture has a water content of 5.0% and a substantially colloidal polymeric dispersion is formed; then the temperature of the dispersion is raised to 45° C. while stirring the composition until it is converted back to a polymer solution.

The beneficial utility of the present process can be further illustrated by repeating Example 2 except (a) the blend of water and dimethylformamide is added until the mixture has a water content of about 6%, and (b) the layer of solution is cooled in step 4 to a temperature slightly higher than 25° C. (e.g., about 27° C.) whereby it is converted to a suitable colloidal dispersion. This illustrates the fact that compositions which are inadvertently rendered useless in practicing the process of U.S. Pat. 3,100,721 (e.g., causing an undue decrease in coating strength and/or increase in pore size) by adding too much water or other inert liquid can often be rendered useful in accordance with the present process by employing suitable temperatures in the operations of converting the composition back to a solution after adding inert liquid, and the subsequent cooling to convert the solution to a useful colloidal dispersion.

I claim:

1. A process for preparing microporous polymeric films and coatings which comprises:

(A) providing a solution of a polymeric material in a mixture of a suitable solvent and an inert liquid, said solution having a temperature of at least 20° C., said inert liquid being a nonsolvent for said polymeric material and miscible with said solvent, and said solution containing said inert liquid in an amount equal to that which enables the solution to become a substantially colloidal polymeric dispersion when cooled by at least 5° C., (B) applying a layer of the resulting solution to a suitable substrate, (C) subjecting said layer to cooling and bathing conditions such that (1) the layer is cooled by at least 5° C., (2) the solution is converted to a substantially colloidal polymeric dispersion and (3) the layer is bathed with a bathing liquid adapted to extract said solvent until substantially all the solvent is extracted, and (D) drying the resulting cooled, bathed layer.

2. A process according to claim 1 wherein the polymeric material of the solution in step (A) has a secant tensile modulus at 5% elongation of over 600 p.s.i.

3. A process according to claim 1 wherein said solution in step (A) has a temperature of about 37–90° C.

4. A process according to claim 1 wherein said solution contains said inert liquid in an amount equal to about 3–5% based on the total weight of the resulting mixture.

5. A process according to claim 4 wherein said inert liquid is water and the solvent of said solution is dimethylformamide.

6. A process according to claim 2 wherein said polymeric composition contains about 51–100% by weight of a polyurethane polymer and up to about 49% by weight of a vinyl chloride polymer.

7. A process according to claim 1 wherein the substrate used in step (B) is a fabric.

8. A process according to claim 1 wherein step (A) is carried out by adding to a polymer solution enough inert liquid to form a substantially colloidal polymeric dispersion, and then raising the temperature of said dispersion until it is converted back to a polymer solution.

References Cited

UNITED STATES PATENTS

| | | | |
|---|---|---|---|
| 3,100,721 | 8/1963 | Holden | 117—63 |
| 3,190,765 | 6/1965 | Yuan | 117—63 |
| 3,190,766 | 6/1965 | Yuan | 117—63 |
| 3,208,875 | 9/1965 | Holden | 117—63 |
| 3,296,016 | 1/1967 | Murphy | 117—63 |
| 3,418,198 | 12/1968 | Einstman | 117—63 |
| 3,460,969 | 8/1969 | Murphy | 117—63 |

WILLIAM D. MARTIN, Primary Examiner

MICHAEL SOFOCLEOUS, Assistant Examiner

U.S. Cl. X.R.

117—135.5